A. H. HEYROTH.
WINDMILL POWER PLANT.
APPLICATION FILED DEC. 17, 1912.
1,114,759.
Patented Oct. 27, 1914.
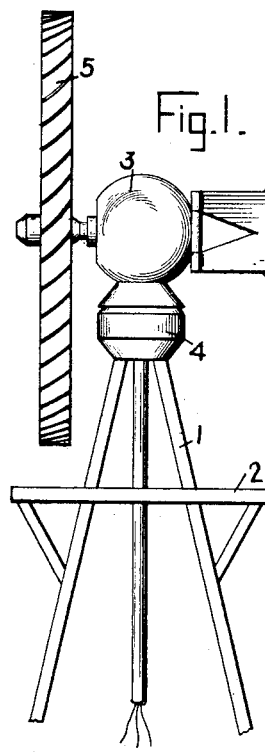
Fig.1.
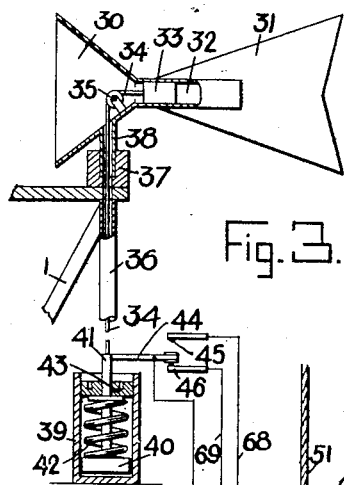
Fig.3.
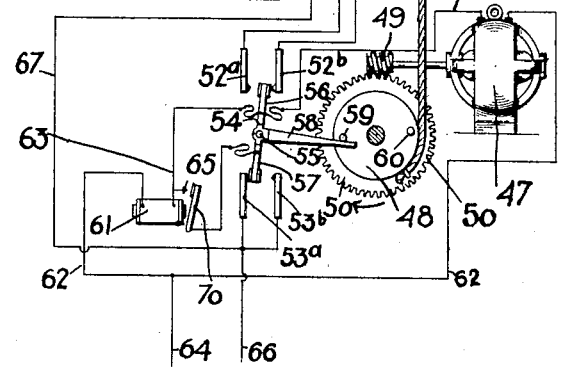
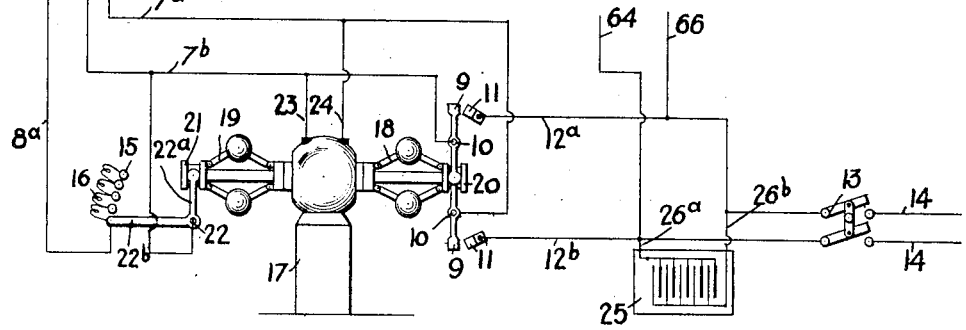
Fig.2.
WITNESSES
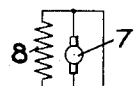
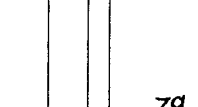
INVENTOR
ALBERT H. HEYROTH,
BY Munn&Co
ATTORNEYS

UNITED STATES PATENT OFFICE.

ALBERT H. HEYROTH, OF GREAT FALLS, MONTANA.

WINDMILL-POWER PLANT.

1,114,759.  Specification of Letters Patent.  Patented Oct. 27, 1914.

Application filed December 17, 1912.  Serial No. 737,202.

*To all whom it may concern:*

Be it known that I, ALBERT H. HEYROTH, a citizen of the United States, and a resident of Great Falls, in the county of Cascade and State of Montana, have invented a new and Improved Windmill - Power Plant, of which the following is a full, clear, and exact description.

This invention relates generally to windmill power plants, and is particularly directed to methods of control in the event that the wind varies its velocity or rises to such a velocity that the voltage generated becomes excessive.

The principal object of the invention is the provision of a system of control whereby the generator and the storage battery may be brought to coöperative relation with the service mains.

It is also an object of the invention to provide a means for changing the position of the rudder of the mill in the event that the wind attains such a velocity as to drive the generator at an excessive speed.

The system set forth forms a unitary method of control, especially adapted to windmill power plants characterized by few mechanical devices of simple construction, thereby tending to low first cost and minimum operating expenses.

Reference is to be had to the accompanying drawings forming a part of this specification, in which like characters of reference indicate corresponding parts in all the views, and in which—

Figure 1 is a side view of the windmill structure; Fig. 2 is a diagrammatic view of the means for controlling the voltage during variations in the wind velocity, while Fig. 3 is a sectional view, partly diagrammatic, showing the means for bringing the vane of the mill out of the wind during excessive velocity.

The windmill itself may be of any desired construction, and preferably comprises the standards 1 having a platform 2 thereon adjacent the top, the generator 3 being mounted on a turn-table 4 carried by the top of the structure, the wind wheel 5 being connected directly to one end of the generator shaft; also carried by the generator structure is a vane 6 of any suitable form.

Referring particularly to Fig. 2, 7 is representative of the armature of the generator 3, while 8 is representative of the field winding, the leads $7^a$—$7^b$ from the armature connecting with the arms 9 pivotally mounted at 10, adapted to engage with the blades 11; these blades connect with the conductors $12^a$—$12^b$, and extend to the double-pole switch 13, the service wires 14 being connected to the said switch. One end of the field winding 8 is connected directly to one side of the armature 7, as is common in such structures, the other side of the field being connected to one of a plurality of studs 15 through a wire $8^a$, these studs being bridged by resistances 16 of suitable values.

A motor 17 has centrifugal devices 18—19 carried on its shaft, which devices comprehend collars 20—21 slidably mounted on the shaft, adjacent ends of the before-mentioned arms 9 engaging with the said collar 20 so that as the motor increases its speed the centrifugal device 18 will bring the ends of the arms 9 into contact with the blades 11. Pivotally mounted at 22 is a switch arm, shown as a bell crank lever, one arm $22^a$ engaging with the collar 21 forming part of the centrifugal device 19, the other arm $22^b$ contacting with one of the studs 15, whereby the resistance of the field circuit will be varied. The service wires 23 of this motor are tapped to the leads $7^a$—$7^b$ coming from the generator armature, whereby power is applied to the motor. Finally, a storage battery 25 is connected across the leads $12^a$—$12^b$ to the service mains by conductors $26^a$—$26^b$, the storage battery operating in multiple with the said generator 3.

When the windmill operates the armature of the generator is turned, and the field circuit being closed an E. M. F. is set up by the machine, the motor 17 running by reason of its connection to the generator, and bringing the arms 9 into contact with the blades 11, whereby voltage is brought to one side on the switch 13; if this switch is closed, voltage is also present between the service wires 14. The storage battery 25 being connected across the conductors from the generator will be charged thereby if the voltage of the battery permits it; or will float on the line along with the generator. If the velocity of the wind rises and the speed of the generator increases, the motor 17 will also increase its speed, with the result that the centrifugal device 19 will move the switch arm 22$^b$ to some one of the studs 15, depending on the speed of the motor, whereby the resistance of the generator field will be increased and the E. M. F. induced will be lessened, thereby bringing such E. M. F. to substantially the same amount as that of the storage battery. If the speed of the generator falls sufficiently the centrifugal device 18 brings the arms 9 out of contact with the blades 11, thereby preventing the storage battery from forcing current through the generator due to the higher voltage of the battery.

When the generator is idle the motor is also idle, the parts being substantially in the position indicated in Fig. 2. This system of control effectively takes care of the voltage of the generator over a wide range of speed, and the speed of the motor 17 and the resistance unit 16 being properly determined, the generator and the storage battery will work together; of course, the storage battery is at all times connected to the leads 12$^a$—12$^b$, and voltage is present between the service mains 14 at all times if the storage battery is charged and the switch 13 is closed.

It very often happens that the velocity of the wind becomes excessive, thereby driving the generator at such a speed that the particular control described is not adapted to properly regulate; in such event the controlling system shown particularly in Fig. 3 is utilized. In this case the funnel 30 and vane 31 are so formed as to make a substantially single structure, the bottom of the funnel being provided with a pocket 32 having a plunger 33 movable therein, a wire or cord 34 extending from the plunger around a pulley 35 and passing downwardly through a suitable housing 36, being engaged with certain parts to be presently described. The funnel and vane are rotatably mounted in position in any suitable manner, the structure shown comprising a bearing 37 into which an offset 38 carried by the funnel is inserted, the said cord or wire 34 passing downwardly through the bearing; such structure is capable of swinging freely in the wind, the idea being to bring the open end of the funnel into the wind so that the force due thereto may be exerted against the plunger 33.

Mounted within a suitable casing 39 is a plunger 40 having a post 41 extending upwardly therefrom, a helical spring 42 being contained within the housing and surrounding the said post, the upper end of the housing being closed by means of an adjustable cover 43 in threaded engagement with the interior of the housing, whereby the pressure exerted by the spring against the plunger may be varied. The said wire or cord 34 is secured to this plunger 40, and in the event that the velocity of the wind reaches a certain amount the movement of the plunger 33 will compress the spring 42 and bring the arm 44 carried by the post 41 into engagement with a fixed contact 45; in normal position this arm 44 engages the fixed contact 46.

Suitably mounted in position in any desired place is a motor 47 connected to a drum 48 by means of the worm and gear 49—50 carried by the motor shaft and the said drum; fixed to the drum and adapted to be wound thereon is a flexible element 51, such as a rope, the other end of the rope engaging the vane 6 of the mill previously mentioned, whereby force may be applied thereto in order to bring the mill out of the wind. Suitably mounted in position are fixed contacts 52$^a$—52$^b$, and oppositely disposed thereto are other contacts 53$^a$—53$^b$, a lever 54 pivotally mounted in position at 55 having its arms 56—57 lying between the said contacts, the arm 56 being adapted to engage either 52$^a$ or 52$^b$, the arm 57 being adapted to engage either 53$^a$ or 53$^b$, the relation being such, however, that the contacts so engaged are those diagonally opposite. This lever is provided with an offset arm 58 extending alongside the drum 48, the drum being provided with fingers 59—60 extending therefrom, the normal position of the parts being as indicated in Fig. 3.

A relay 61 has the wires 62—63 leading therefrom, the wire 62 being connected to one side of the motor 47, and also communicating with one side of the before-mentioned generator 3 and storage battery 25 through a wire 64; the other wire 63 from the relay is connected to a fixed contact 65, said wire being connected to the other side of the motor 47, and being also connected to the said arm 56 of the switch. The fixed contact 53$^a$ is connected to the other side of the generator and storage battery through a wire 66, the arm 44 on the post 41 being connected to the adjacent contact 53$^b$ through a wire 67. The fixed contacts 45—46 are connected to the fixed contacts 52$^b$—52$^a$ through the wires 68—69; finally, a pivoted armature 70 is adapted to be moved by the field due to the electro-magnet or relay 61, this armature being connected to the arm 57 of the drum-controlled switch, one end of this armature being adapted to engage the contact 65 connected to the said wire 63.

The operation of this controlling circuit is as follows: The funnel 30 is kept in the wind by means of the vane 31, the wind blowing into the funnel acting on the plunger 33 and tending to compress the spring 42, depending on the adjustment of the cover 43 of the housing 39 which contains this spring; if the wind becomes strong enough to raise the plunger 40 and the post 41, the arm 44 carried by the post will come out of engagement with the contact 46 and come into engagement with the contact 45, the following circuit being thereby closed:—from one side of the battery through the motor 47, through the arm 56 of the switch to the fixed contact 52$^b$, through the fixed contact 45, through the arm 44 on the post 41, thence to the other side of the battery and generator through the wires 67 and 66. The motor 47 will now turn the drum 48 in the direction indicated by the arrow, the cable or rope 51 being thereby wound on the drum, the vane 6 being turned parallel to the mill 5 and causing the latter to be swung out of the wind in the usual manner. The engagement of the arm 44 with the fixed contact 45 also completes another circuit as follows:—from one side of the battery through the wire 64, through the relay 61, through the wire 63 to the arm 54 of the switch, thence through the fixed contact 52$^b$, through the wire 68, the contact 45 and the wire 67 to the other side of the battery, through the wire 66. The relay 61 is energized through completion of this circuit and establishes a holding circuit as follows:—to one side of the battery through the wire 64, through the relay 61, through the fixed contact 65, through the armature 70, through the arm 57 of the switch, through the fixed contact 53$^a$, and thence to the other side of the battery through the wire 66. Further, a circuit is completed through the motor in the following manner:—from the battery through the wire 64, through the motor 47, through the wire 63 to the arm 56 of the switch, through the wire leading from this arm to the contact 65, through the armature 70 to the arm 57 of the switch, and, finally, through the contact 53$^a$ to the other side of the battery through the wire 66; due to this circuit the operation of the motor is independent of the operations of the switch formed by the arm 44$^a$ and the contacts 45—46 adjacent thereto; that is, the motor will continue to operate as long as the armature 70 engages the fixed contact 65, and the engagement lasts between the arm 57 of the switch and the contact 53$^a$.

During the flowing of current through the circuits as described the vane has been brought to a position out of the wind, and the pin 59 on the drum 48 has moved away from the end of the arm 58, the second pin 60 on the drum engaging the end of this arm and operating the switch, bringing the arms 56—57 into engagement with the contacts 52$^a$ and 53$^b$. The opening of the circuit due to the movement of the arm 57 away from the contact 53$^a$ interrupts the motor circuit and also the circuit through the relay 61; the motor, therefore, stops and the relay releases the armature 70. However, when the vane has been brought out of the wind, as described, the drum 48 operates a reversing switch in the field circuit of the motor 47 so that when the motor circuit is again closed the armature will turn in the opposite direction.

When the wind drops to a safe velocity the plunger 33 adjacent the bottom of the funnel 30 will come back to normal position, thereby permitting the arm 44 on the post 41 to come back into engagement with the fixed contact 46, as shown in Fig. 3; a circuit will then be established from one side of the battery through the wire 64, through the motor 47 because of the wire 62, through the wire 63 to the arm 54 of the switch, to the fixed contact 52$^a$, to the fixed contact 46, through the wire 69 from the said contact, through the wire 67, to the other side of the battery through the wire 66; the motor will now operate and turn the drum 48 in an opposite direction to that shown by the arrow, thereby unwinding the rudder cable and allowing the windmill to swing in the wind.

As previously set forth the engagement of the contact 46 with the arm 44 also closes a circuit through the relay 61 through the contact 52$^a$ because of the wire 63; the relay 61 establishes a holding circuit through the fixed contact 65; through the contact 53$^b$ because of the engagement of the arm 57 therewith; a circuit is also closed through the motor 47, thereby making the operation of the motor independent of the switch made up of the contacts 45—46 and the arm 44. The motor will now continue to unwind the drum 48 until the pin 59 has again come into engagement with the arm 58, as shown in Fig. 3; the arms 56 and 57 of the switch lever forming part of the arm 58 will be operated, the contacts 52$^b$ and 53$^a$ coming into engagement with the said arms; the relay 61 will be deënergized and the initial contacts will again obtain. Thus it will be seen that the object of the relay 61 is to prevent the vane from remaining in any intermediate position if there are rapid wind changes, so that the engagement between the contacts 45 or 46 and the arm 44 does not last long enough to permit the motor 47 to completely wind or unwind the drum. With the arrangement shown a momentary closing of the circuit through the contact 45 or 46 will cause the windmill to be completely swung into, or out of, the wind.

From the description given it will appear that a windmill power plant, with controlling devices therefor, is set forth, whereby close regulation of voltage of the service mains may be obtained over wide changes in generator speed or wind velocity. The system described contemplates the use of the storage battery shown, whereby fluctuations in voltage will be less marked, it being clear, however, that the generator and the controlling systems may be used without such battery, if so desired.

Other structures may accomplish the purposes set forth, the choice of such structures being determined by the spirit and scope of the following claims.

Having thus described my invention, I claim as new and desire to secure by Letters Patent:

1. In a windmill power plant, the combination of a generator and a storage battery adapted to be operated in multiple, a motor actuated by the generator, a plurality of centrifugal devices actuated by the motor, a rheostat forming part of the generator field circuit, one of the centrifugal devices actuating the arm of the said rheostat, and a switch between the battery and the generator for disconnecting them when the voltage falls below a predetermined amount, the said switch being operatively associated with the other centrifugal device.

2. In a windmill power plant, the combination with a generator having a shunt field circuit, a storage battery, a pair of contacts, a pair of movable switch arms, each of said arms being arranged to engage one of said contacts, connections between the generator terminals and each of said arms, a motor having its terminals connected to the terminals of the generator, a centrifugal device carried by the motor on one side thereof for bringing said arms into engagement with their respective contacts at a predetermined speed of the motor, a variable resistance in the shunt field circuit of the generator, a pivoted arm for operating said variable resistance, and a centrifugal device disposed on the opposite side of the motor from the first named centrifugal device for shifting the position of said last named arm.

In testimony whereof I have signed my name to this specification in the presence of two subscribing witnesses.

ALBERT H. HEYROTH.

Witnesses:
LOUISE F. RUNK,
J. H. CORCORAN.